United States Patent Office 3,481,262
Patented Dec. 2, 1969

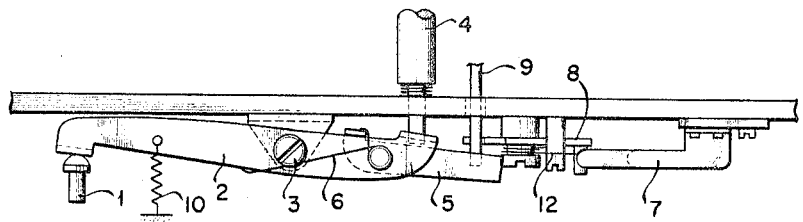
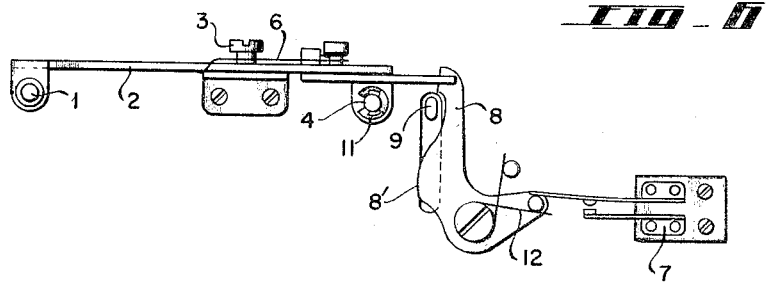
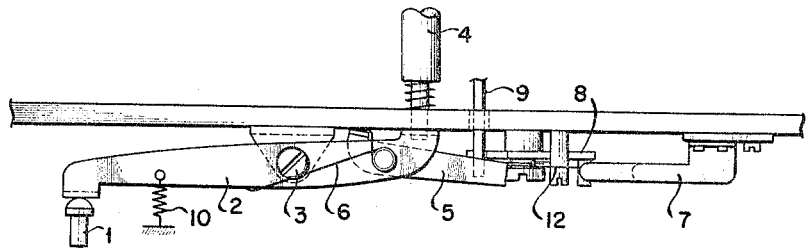

3,481,262
SHUTTER RELEASE SYSTEM IN AUTOMATIC
FILM WINDING CAMERA
Minoru Suzuki and Katsuhiko Nomura, Tokyo, Japan, assignors to Asahi Kogaku Kogyo Kabushiki Kaisha, Tokyo-to, Japan, a corporation of Japan
Filed Mar. 6, 1967, Ser. No. 620,696
Claims priority, application Japan, Mar. 10, 1966, 41/21,135
Int. Cl. G03b 19/04
U.S. Cl. 95—31                                    4 Claims

ABSTRACT OF THE DISCLOSURE

A normally closed switch is connected in a circuit with an electric motor which motivates a camera film advance and shutter cocking mechanism. In order to assure a stationary film during the shutter open condition a first lever which is swingably advanced by a shutter release actuating member, has an arm pivoted to its free end which is spring urged to follow the first lever. A second lever cooperates with the switch and is swingable between a switch open and a switch closed position and is spring urged to a switch open position. The second lever lies in the path of the retracted arm so as to be restricted to the switch closed position and is released, by the advance of the first lever, to a switch open position and remains in such position by reason of the free movement of the arm, following the retraction of the first lever. An element advances the second lever to a switch closed position when the shutter is returned to its uncocked condition.

BACKGROUND OF THE INVENTION

The present invention relates generally to improvements in cameras provided with automatic film advancing mechanisms and it relates particularly to an improved system for assuring the proper correlation of the film advance, shutter cocking and shutter release operations.

In cameras provided with film advancing mechanisms which automatically perform the various operations preparatory to the exposure of a film frame, including the increment advance of the film and the cocking or charging of the shutter, it is essential that such preparatory operations be properly correlated with the film exposure operation so that there is no interference among the various operations. For the proper operation of the camera there should be no movement or advance of the film during the period between the release of the shutter to its open position and its return to its closed position following which period the film should be advanced a frame and the shutter cocked. The conventional automatic film advancing cameras leaves much to be desired in the control and correlation of the film advancing and shutter release and cocking operations.

SUMMARY OF THE INVENTION

A principal object of the present invention is to provide in an automatic film advancing mechanism, a system which assures the proper correlation of the film advancing and shutter cocking and shutter release operations.

Still another object of the present invention is to provide in an automatic film advancing camera a system for positively preventing any advance of the film during the film exposure period.

The above and other objects of the present invention will become apparent from a reading of the following description taken in conjunction with the accompanying drawings.

In a sense the present invention contemplates the provision of the combination with a camera including a shutter and a film advancing and shutter cocking electric motor of first means including a switch connected in an energizing circuit with said electric motor and movable between energizing and deenergizing conditons respectively, second means responsive to the movement of said shutter to its uncocked position for urging said switch to said energized condition, and third means for positioning said switch in said deenergized condition when said shutter is in an open postion. Advantageously means are provided for releasing the shutter independently of the actuation of said third means. In addition, means are also advantageously provided for maintaining the switch in its deenergized position while the shutter is in its released position independently of the actuation of the third means.

The present mechanism assures the proper and precise correlation of the film advancing and shutter cocking and release operations and permits the release of the shutter without the initiation of the film advance and shutter cocking operations.

BRIEF DESCRIPTION OF THE DRAWINGS

FIGURE 5 is a view similar to FIGURE 1 with the mechanism shown in a shutter release actuation position;

FIGURE 6 is a bottom plan view thereof; and

FIGURE 7 is a view similar to FIGURE 1 with the mechanism illustrated in a position during the shutter release operation wherein the shutter release actuating member has been returned to its retracted position.

DESCRIPTION OF THE PREFERRED EMBODIMENT

Figure 1:
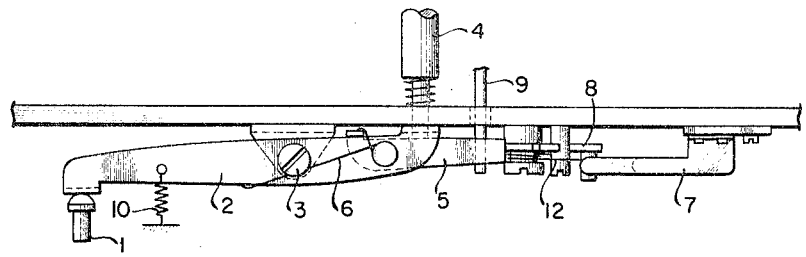
FIGURE 1 is a front elevational view of a mechanism embodying the present invention illustrated in a position following the shutter release operation.

Referring now to the drawings which illustrate a preferred embodiment of the present invention, the reference numeral 2 generally designates a lever rockably mounted between its ends on a fixed pivot 3 supported by the camera casing. The outer end of the lever 3 is positioned adjacent to and is provided with a shoulder which engages a shutter release actuating member 1 driven by the film advancing mechanism associated with the camera through an arrangement whereby the actuating member 1 is advanced, or raised as viewed in the drawings, prior to the drive of the film advancing or take-up member. The inner end of the lever 3 is provided with a shoulder engaged by a shutter rod 4, the depression of which rod 4 effects the camera shutter release. An arm or engaging piece 5 is pivoted to and projects beyond the inner end of the lever 2 and is urged by a spring 6 to resiliently move with the inner end of the lever 2. A bell crank shaped switch lever 8 is pivoted at its elbow and includes a first leg provided with an abutment which is movable into actuating engagement with the arm of a normally closed switch 7. The switch 7 is connected in the current supply network for the film winding and shutter cocking drive motor whereby closure of the switch 7 completes the motor energizing circuit and the opening of the switch 7 opens the energizing circuit to deenergize the motor. The switch lever 8 includes a second leg which is positioned and adjacent to and swingable into the path of movement of the arm 5. An arm or lever 9 vertically movable with the cocking or charging of the camera shutter is positioned adjacent to a cam surface or edge 8′ of the switch lever 8 and is movable into engagement therewith so that when the arm 9 is in its depressed or shutter uncocked position it engages the cam edge 8' and retains the switch lever 8 out of the path of movement of the engaging piece 5. A tension spring 10 is connected between the outer part of the lever 2 and a fixed member to resiliently urge the lever 2 counter-clockwise as viewed in FIGURE 1 into engagement with the shutter actuating member 1. The rod 4 is spring urged upwardly and is provided with a lower end of reduced cross section which engages an opening in a transverse lug at the inner end of the lever 2 and is slidable therein, the rod 4 being provided with a stop member 11 at its lower end which engages the underface of said lug whereby depression of the inner end of the lever 2 effects the depression of the rod 4, and the rod 4 is free to move downwardly independently of the movement of the lever 2. A spring 12 resiliently urges the switch lever 8 in a counter-clockwise direction as viewed in FIGURE 2.

Figure 2:
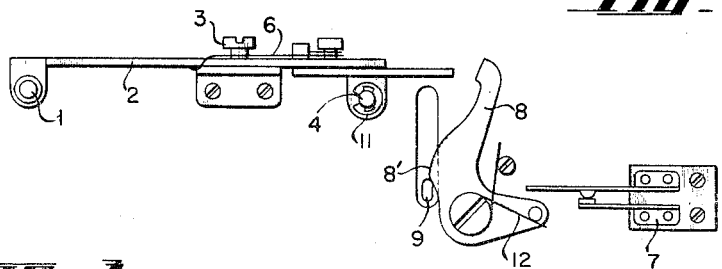
FIGURE 2 is a bottom plan view thereof.

The operation of the improved mechanism described above is as follows:

When the shutter release operation has been completed, the shutter charge lever 9 is in its lower position (FIG. 2) with its side surface abutting against the cam surface 8' of the switch lever 8 so that the lever 8 is in its clockwise swung position against the action of the spring 12 (FIG. 2). Accordingly, the switch lever 8 is out of engagement with the normally closed switch 7.

Under these conditions the switch 7 remains closed, so that, with its current supply circuit closed, the driving motor of the automatic film winding mechanism is energized whereby to perform the preparatory operation of the film winding and shutter cocking. At this time, the shutter release actuating member 1 and the shutter rod 4 are in the respective positions they occupied before the shutter release operation, and the lever 2 and the engaging piece 5 are in the respective positions as shown in FIG. 1.

When the preparatory operation of film winding and shutter cocking is completed and the shutter cocking lever 9 moves upward from its position shown in FIG. 2 in its shutter cocking operation, the switch lever 8 is disengaged from the lever 9 and, under the influence of the spring 12, swings counter-clockwise as viewed in FIG. 2 so that one end thereof abuts against the end of the engaging piece 5. This swing movement of the switch lever 8 brings the end of said switch lever 8 proximate the position where it acts upon the normally closed switch 7, but to a position where it does not open the switch 7.

Accordingly, at this time the automatic film winding mechanism is not in operation because driving power transmission is stopped due to slipjoint action of the driving power transmission mechanism, or alternatively a switch mechanism other than said switch 7 opens the driving current supplying circuit upon completion of film winding in response to a phase of the operation of the film winding mechanism. This condition is shown in FIGS. 3 and 4.

Figure 3:
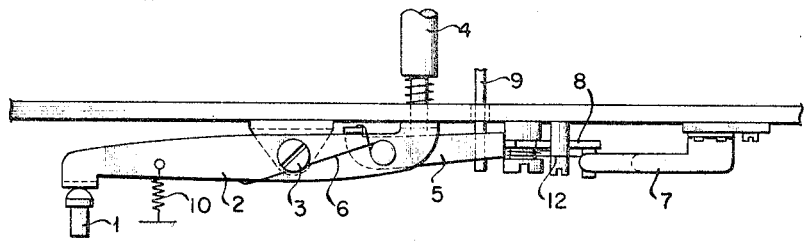
FIGURE 3 is a view similar to FIGURE 1 with the mechanism shown in a position immediately following the completion of the film advance and shutter cocking operations.
Figure 4:
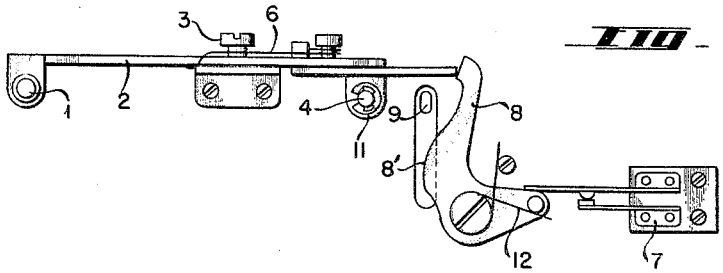
FIGURE 4 is a bottom plan view thereof.

When further operation of the film winding mechanism pushes the shutter release actuating member 1 upward from the position shown in FIG. 3, the lever 2 swings clockwise against the action of the spring 10 so that its inner end portion pulls down the shutter rod 4 against the spring urge, thus actuating shutter release. At the same time, the engaging piece 5 is moved together with the lever 2 and withdraws from the position where it is to act upon the switch lever 8. Accordingly, under the action of the spring 12, the switch lever 8 is somewhat swung counter-clockwise from the position shown in FIG. 4 so that its operating end portion actuates the normally closed switch 7 and opens the switch (FIGS. 5 and 6). Thus, upon the shutter release actuation the film winding drive mechanism is stopped owing to opening of the motor current supply circuit.

If, prior to the completion of shutter release operation, the shutter release actuating member 1 or the shutter rod 4 returns to their respective original positions occupied before shutter release actuation, the film winding drive mechanism still remains stopped because the switch lever 8, which has opened the normally closed switch 7, remains in the same switch open condition. When the switch lever 8 is disengaged from the engaging piece 5, owing to said swing movement, that end portion of the lever 8 which has been hitherto engaged by the piece 5 now enters the return movement path of the engaging piece 5, owing to said swing movement, that end portion of the lever 8 which has been hitherto engaged by the piece 5 now enters the return movement path of the engaging piece 5. Thus, when due to retraction of the actuating member 1 or of the shutter rod 4 the lever 2 is retracted under the influence of the spring 10, the engaging piece 5 abuts against one end of the switch lever 8 and remains in its shifted position, compressing the spring 6 (FIG. 7).

Upon completion of shutter release operation, the shutter cocking lever 9 moves downwardly from the position shown in FIG. 6 and acts upon the cam surface 8' of the switch lever 8 so that the lever 8 is swung clockwise, thereby closing the normally closed switch 7 again. Thus, it is assured that the automatic film winding mechanism remains stopped during the time from the shutter release actuation to the completion of the shutter release operation. In the shutter release actuation of automatic film winding mechanism, the preparatory operation for the next photographic operation such as film winding, etc., is started upon completion of release operation independent of the time of the return movement of the shutter release actuating member 1.

When the shutter rod 4 is depressed in ordinary or photographing operation without use of the automatic film winding mechanism, the shutter rod 4 only is depressed and none of the aforementioned operating members such as the lever 2 is actuated, so that no unncessary load is exerted upon the operation of depressing the rod 4, the operation being very smoothly accomplished just as is the case with the shutter actuating operation in ordinary cameras.

Thus, according to the present invention with an automatic film winding mechanism, stoppage of the film transport or advance is assured during the shutter release operation while upon completion of the release operation the preparatory operations being performed in an optimum sequential manner so as to obtain excellent results in both ordinary and rapidly successive photographing operations. Further, in ordinary photographing operation without the use of automatic film winding mechanism, the shutter rod depressing operation may be smoothly and reliably performed.

While there has been described and illustrated a preferred embodiment of the present invention it is apparent that numerous alterations, omissions and additions may be made without departing from the spirit thereof.

We claim:

1. In combination with a camera including a shutter and a film advancing and shutter cocking electric motor, first means including a switch (7) connected in an energizing circuit with said electric motor and movable between motor energizing and deenergizing conditions respectively, second means (8, 9) responsive to the movement of said shutter to its uncocked condition for urging said switch to said energized condition, and third means (2, 5, 8, 12) for positioning said switch in said deenergized condition when said shutter is in an open position, comprising a first lever (2) pivoted between the ends thereof and swingable between a retracted position and an advanced shutter release position, a switch operating second lever (8) swingable between a switch energized condition and a switch deenergized condition, spring means (12) urging said second lever toward a switch deenergized condition, and an arm (5) carried by said first lever and movable therewith into and out of registry with said second lever and movable relative to said first lever releasing said second lever to a switch deenergized condition when said first lever is in said retracted position.

2. The combination of claim 1 wherein said arm (5) is pivoted to said first lever (2) and spring urged to resiliently follow said first lever.

3. The combination of claim 1 including a shutter rod (4) connected to and movable by said first lever and selectively movable independently of said first lever.

4. A shutter release actuating arrangement in an automatic film winding camera wherein a lever 2 is pivoted to the immovable camera casing at 3 with one end thereof positioned adjacent to a shutter release actuating member 1 driven by the film winding mechanism while the other end thereof is fitted with a shutter rod 4, an engaging piece 5 is swingably pivoted under the urge of an operating spring 6 in the direction of moving together with said lever 2, a switch lever 8 is provided for acting upon a normally closed switch 7 for opening or closing the driving current supplying circuit for the film winding mechanism, one end of said switch lever 8 being positioned adjacent to the moving path of said engaging piece 5, and a shutter charge lever 9 is arranged adjacent to the cam surface 8' of the switch lever 8 so that the switch lever 8 is withdrawn from the path of said engaging piece 5 when said charge lever 9 is in a shutter uncocked position.

References Cited

FOREIGN PATENTS 1,135,283   8/1962   Germany.
1,010,701   11/1963   Great Britain.

NORTON ANSHER, Primary Examiner

D. S. STALLARD, Assistant Examiner